Oct. 1, 1929.    C. B. BAILEY    1,730,110
GASKET
Original Filed May 20, 1925
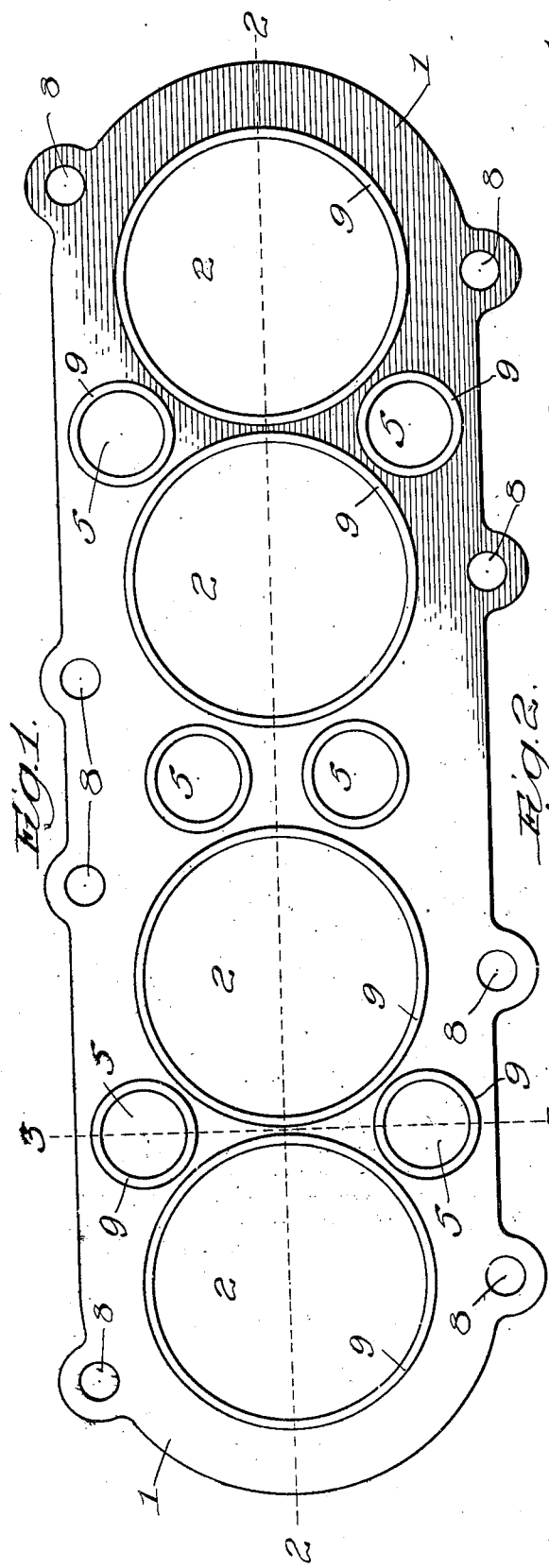
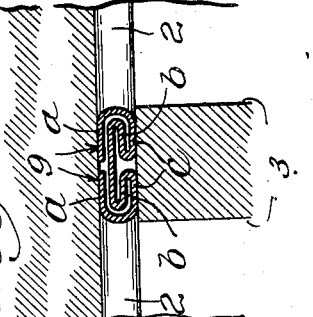
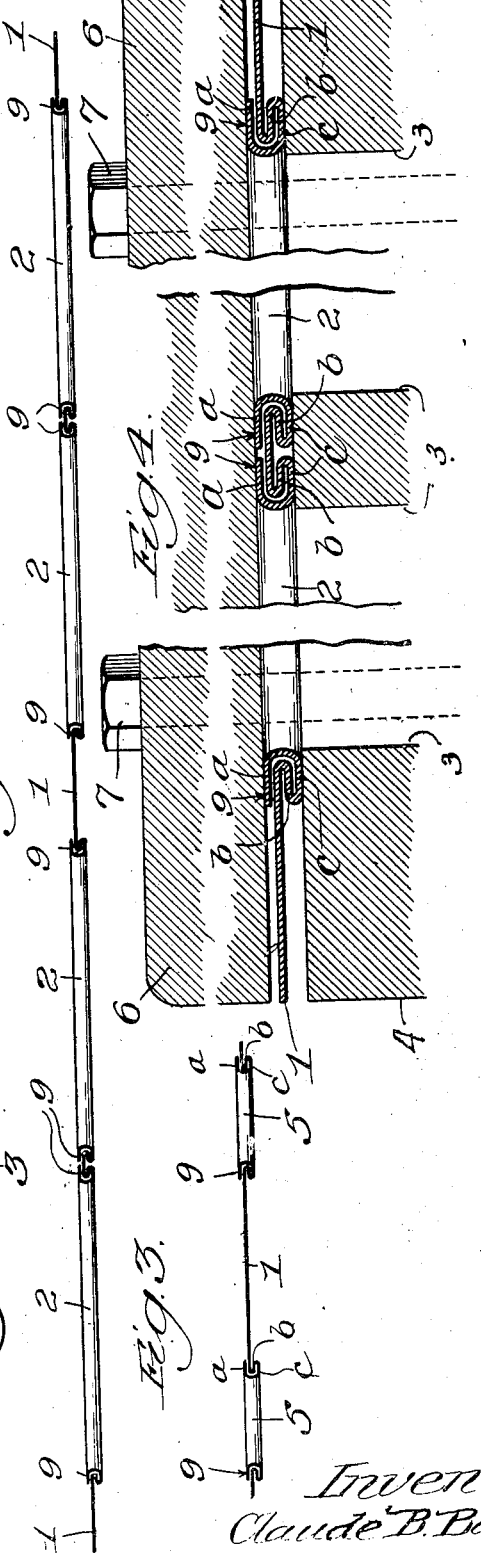
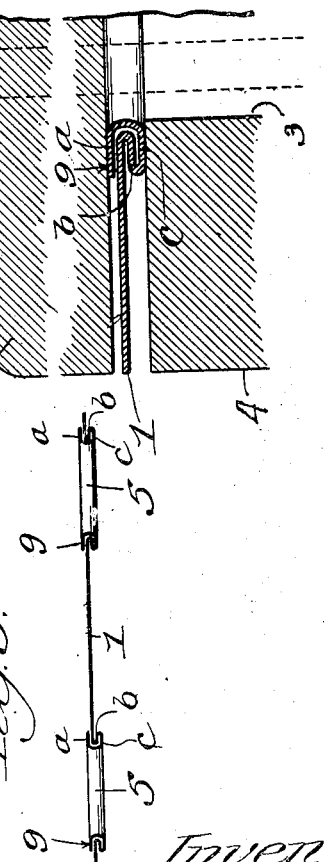
Inventor:
Claude B. Bailey,
By Eugene Curwen
Atty.

Patented Oct. 1, 1929

1,730,110

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Original application filed May 20, 1925, Serial No. 31,483. Divided and this application filed November 2, 1925. Serial No. 66,169.

In my copending application Serial No. 31,483, filed May 20, 1925, and of which the present application is a division, I have disclosed and claimed a gasket having its body and pressure-receiving portions formed from a single piece of sheet metal, with the pressure-receiving portion about the port hole of the gasket and in folded form so as to be thicker than the body portion and thus take the place of the asbestos cushion heretofore generally employed in conjunction with sheet metal gaskets, thereby simplifying the structure and reducing the cost of manufacture thereof.

The invention of the present application has for its object to bend the metal of the gasket body about the port hole into folded form with portions on opposite sides of the body to provide the pressure-receiving portion of the gasket.

The present invention further contemplates the provision of these pressure-receiving portions about the respective port holes or openings in cylinder head gaskets, manifold gaskets, and others having a plurality of spaced holes or openings therein, so that these gaskets may be made entirely from sheet metal and from a single layer thereof to reduce the cost of manufacture and produce efficient gaskets.

In the accompanying drawings—

Fig. 1 is a plan view of a cylinder head gasket constructed in accordance with my invention;

Figs. 2 and 3 are sectional views taken through the gasket on lines 2—2 and 3—3, respectively, of Fig. 1; and Fig. 4 is an enlarged vertical sectional view showing the manner in which the gasket is clamped in place when in use.

As shown in the drawings, the gasket has a flat body portion 1 stamped or otherwise formed from a single layer of sheet metal, such as copper, brass, aluminum, zinc, or other suitable material. Said gasket, when of the cylinder head type, has a plurality of relatively large port holes or openings 2, 2 cut or otherwise formed in its body, 1 and disposed in a row lengthwise thereof, with said holes substantially the same in size and arranged to fit the cylinder bores 3, 3 in the engine block 4, as shown in Fig. 4.

As shown in Fig. 1, the body 1 is further provided with a plurality of smaller port holes 5, 5, also the same in size and arranged to fit about the registering water passages (not shown) in the engine block 4 and its head 6, respectively. When the gasket is clamped between such parts by the usual studs or bolts 7, 7, as in structures of this kind, the gasket has holes 8, 8 at its margins to receive these studs or bolts.

The gasket shown in the drawings is designed for use in four-cylinder internal combustion engines with overhead valves, such as employed in Chevrolet cars; it being of course understood, however, that the gaskets of my invention with the required port hole arrangement may be made for other motors with the same or a greater number of cylinders with different valve arrangements.

Around each of the port holes 2 and 5, I provide a pressure-receiving portion 9. These portions are relatively narrow and are bent into folded form from the metal of the gasket body 1 about the respective port holes and project beyond the plane of the body so as to be thicker than the latter. The metal in making up the folds is under slight tension and the folds are slightly spaced apart. This makes the pressure-receiving portions yieldable to clamping pressures when exerted on the gasket to produce tight joints.

As shown in Figs. 2 and 3 and more in detail in Fig. 4, each pressure-receiving portion 9 is folded to provide four thicknesses of sheet metal about the port hole in conjunction with the body layer 1. The metal is so folded that there is a layer $a$ on one side of the body 1 and two layers $b$, $c$ on the opposite side of the body 1. The layer $b$ is between the body 1 and the layer $c$ and is joined to the body 1 and layer $c$, respectively, by the folds in the metal at the opposite edges of the layer $b$. The layers $a$ and $c$ are joined by the fold in the metal extending through the port hole and closing the spaces between the layers to the entry of fluids passing through the port hole.

With my improvements, the gasket is considerably reduced in thickness as compared to the structures heretofore in use and, being entirely of sheet metal, provides a metal to metal joint when clamped in place, without it being necessary to pay any particular attention to the manner of tightening the gasket down between the head and block. The gasket being entirely of sheet metal and having all parts thereof integral, blow-outs are prevented for the reason that there are no separate parts in the gasket structure to loosen or fracture under high pressures as with gaskets made up of separate metal layers or facings and interposed layers of asbestos, the latter being particularly subject to blow-outs by reason of concealed defects therein.

The gaskets embodying my invention may take various shapes and sizes and are capable of various uses.

The details of structure shown and described herein may be variously changed and modified without departing from the spirit and scope of my invention.

I claim as my invention:

A gasket having a flat body of a single layer of sheet metal with a port hole therein, and a relatively narrow pressure-receiving portion integrally carried by the body about said port hole, said portion being bent into folded form from the metal of the body about the port hole and having three layers only substantially parallel to each other and to the body with one layer on one side of the body and the other two on the opposite side of the body, all of said layers being integrally connected by the folds in the metal between them and with the fold connecting the outer layers extending through said port hole.

In testimony whereof, I affix my signature this 28 day of Oct., 1925.

CLAUDE B. BAILEY.